United States Patent
Kimball

(10) Patent No.: US 8,306,023 B2
(45) Date of Patent: Nov. 6, 2012

(54) SMUGGLING AND RECOVERY OF NON-PACKET INFORMATION

(75) Inventor: Karen E. Kimball, Sacramento, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1053 days.

(21) Appl. No.: 11/018,061

(22) Filed: Dec. 20, 2004

(65) Prior Publication Data

US 2006/0133425 A1    Jun. 22, 2006

(51) Int. Cl.
*H04L 12/56* (2006.01)

(52) U.S. Cl. ........................ 370/389; 709/208

(58) Field of Classification Search ............ 370/477, 370/235, 230.1
See application file for complete search history.

(56) References Cited

U.S. PATENT DOCUMENTS

| | | | |
|---|---|---|---|
| 5,802,319 A | 9/1998 | Faulk, Jr. et al. | |
| 5,859,959 A | 1/1999 | Kimball et al. | |
| 5,905,859 A * | 5/1999 | Holloway et al. | 726/22 |
| 6,018,770 A | 1/2000 | Little et al. | |
| 6,038,600 A | 3/2000 | Faulk, Jr. et al. | |
| 6,128,729 A | 10/2000 | Kimball et al. | |
| 6,345,041 B1 | 2/2002 | Kimball et al. | |
| 6,697,368 B2 | 2/2004 | Chang et al. | |
| 7,085,961 B2 * | 8/2006 | Chang et al. | 714/13 |
| 7,092,390 B2 * | 8/2006 | Wan | 370/392 |
| 7,099,584 B1 * | 8/2006 | Narvaez et al. | 398/58 |
| 7,181,547 B1 * | 2/2007 | Millet | 709/251 |
| 7,301,952 B2 * | 11/2007 | Furukawa et al. | 370/400 |
| 7,372,809 B2 * | 5/2008 | Chen et al. | 370/229 |
| 7,386,013 B1 * | 6/2008 | Beser | 370/477 |
| 8,157,651 B2 | 4/2012 | Meares et al. | |
| 2002/0057696 A1 * | 5/2002 | Tanabe et al. | 370/395.2 |
| 2002/0061018 A1 * | 5/2002 | Chien | 370/389 |
| 2003/0154399 A1 * | 8/2003 | Zuk et al. | 713/201 |
| 2004/0024831 A1 * | 2/2004 | Yang et al. | 709/208 |
| 2006/0129629 A1 * | 6/2006 | Kawashima et al. | 709/203 |

* cited by examiner

*Primary Examiner* — Kevin C Harper
*Assistant Examiner* — Rhonda Murphy

(57) ABSTRACT

One embodiment disclosed relates to a networking apparatus. The networking apparatus includes a plurality of blade subsystems and a master system communicatively coupled to the blade subsystems. A particular blade subsystem is configured to provide an additional feature in relation to processing network packets. The remaining blade subsystems are configured to send non-packet information to the one blade subsystem by replacing original information in a packet with the non-packet information. The particular blade subsystem is further configured to retrieve the non-packet information from the packet. Other embodiments are also disclosed.

18 Claims, 5 Drawing Sheets

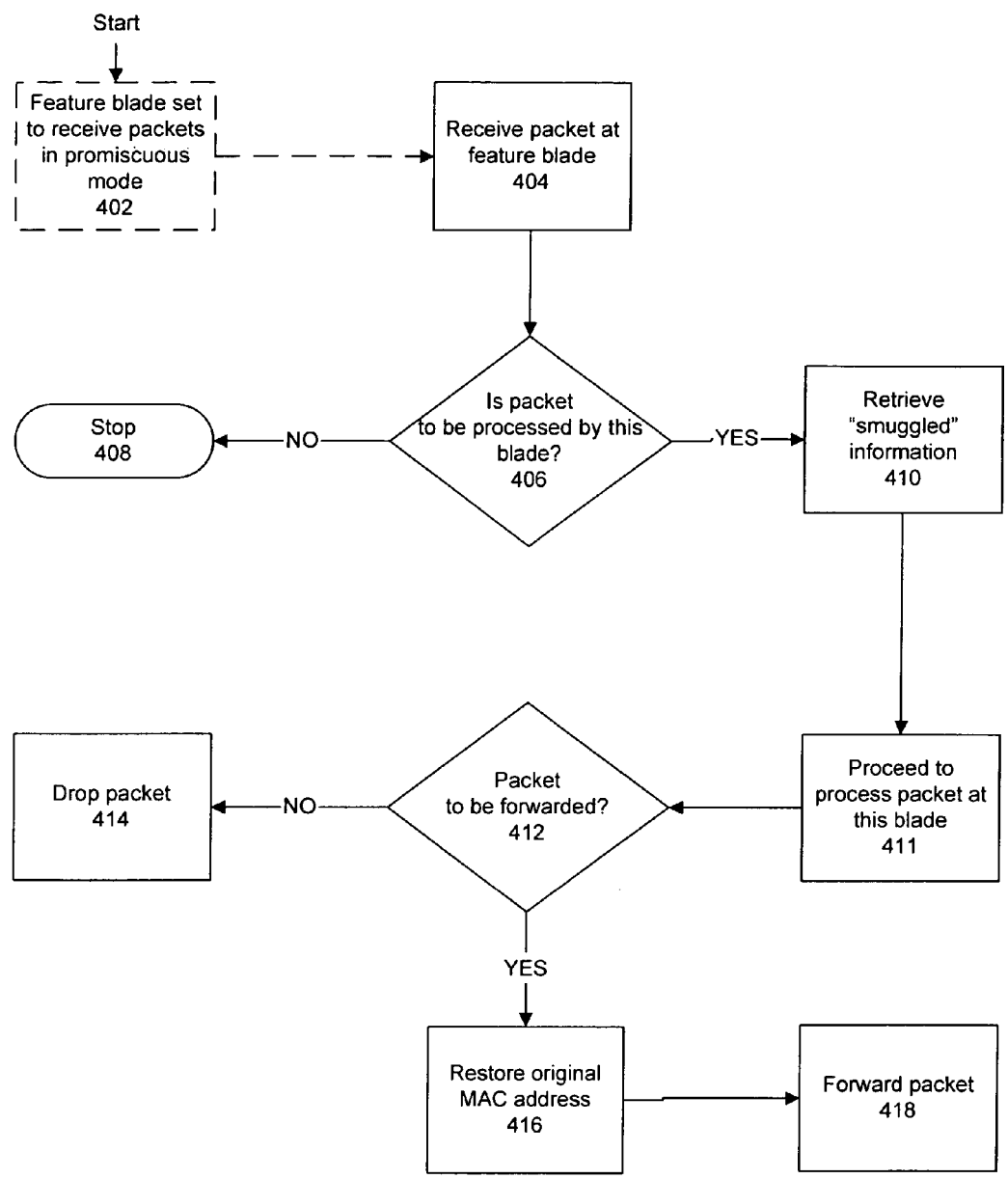
FIG. 4          400

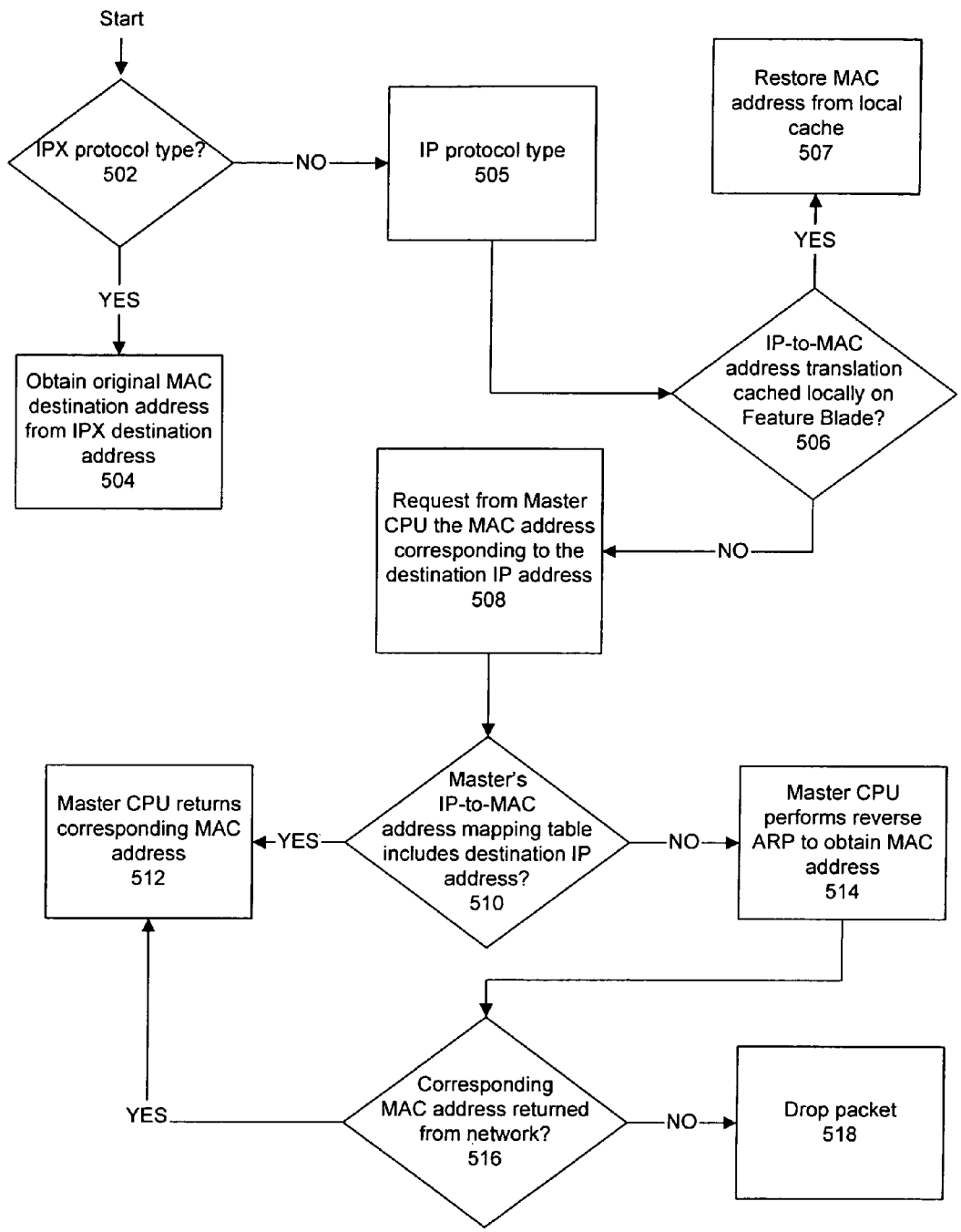
FIG. 5    500

SMUGGLING AND RECOVERY OF NON-PACKET INFORMATION

BACKGROUND

1. Field of the Invention

The present disclosure relates generally to data networks.

2. Description of the Background Art

A network switch is a device that provides a switching function (i.e., determines a physical path) in a data communications network. Switching involves transferring information, such as digital data packets or frames, among entities of the network. Typically, a switch is an intelligent processor having a plurality of network port cards or ports coupled to a backplane. In the switching art, the network port cards are typically called "blades." The blades are interconnected by a "switch fabric." Each blade includes a number of physical ports that couple the switch to the other network entities over various types of media, such as Ethernet, FDDI (Fiber Distributed Data Interface), or token ring connections. A network entity includes any device that transmits and/or receives data packets over such media.

The switching function provided by the switch typically includes receiving data at a source port from a network entity and transferring the data to a destination port. The source and destination ports may be located on the same or different blades. In the case of "local" switching, the source and destination ports are on the same blade. Otherwise, the source and destination ports are on different blades and switching requires that the data be transferred through the switch fabric from the source blade to the destination blade. In the case of a multicast data transfer, the data may be provided to a plurality of destination ports of the switch.

It is desirable to improve apparatus and methods for network switching.

SUMMARY

One embodiment of the invention pertains to a networking apparatus. The networking apparatus includes a plurality of blade subsystems and a master system communicatively coupled to the blade subsystems. A particular blade subsystem is configured to provide an additional feature in relation to processing network packets. The remaining blade subsystems are configured to send non-packet information to the one blade subsystem by replacing original information in a packet with the non-packet information. The particular blade subsystem is further configured to retrieve the non-packet information from the packet.

Another embodiment pertains to a method of providing an additional feature to an existing networking apparatus, the apparatus having a master system coupled to multiple blade subsystems. A blade subsystem is replaced with a feature blade subsystem configured to provide the additional feature in relation to processing network packets. The remaining blade subsystems are kept and are configured to embed non-packet information in packets forwarded to the feature blade subsystem.

Another embodiment pertains to a method of providing additional processing of packets in a networking apparatus having a master system coupled to multiple blade subsystems. A determination is made as to whether a packet received at a blade subsystem is to receive the additional processing. If the packet is to receive the additional processing, then the packet is modified by embedding non-packet information therein and forwarding the modified packet to another particular blade subsystem for the additional processing.

Another embodiment pertains to a network switch configured to provide additional processing of packets. In the network switch, the additional processing of packets received on any of the network port blades is provided by a particular network port blade.

Other embodiments are also disclosed.

BRIEF DESCRIPTION OF THE DRAWINGS

FIG. 4 is a flow chart depicting a method of recovering non-packet information in accordance with an embodiment of the invention.

FIG. 5 is a flow chart depicting a method of restoring a MAC destination address in accordance with an embodiment of the invention.

DETAILED DESCRIPTION

It is often the case that new features are desired to be added to a bladed network switch after the system has already been released for use. Previously, ways to provide later features to an already-released system would include (a) having the master central processing unit (CPU) of the system perform the features itself, or (b) having every blade changed to implement the features. Both of these forms of prior solutions have disadvantages.

The master CPU typically performs various other network tasks for the system, such as routing or servicing standard network protocols. Hence, if all packets are forwarded to the master CPU for processing, then the master CPU may be overloaded. In addition, the master CPU may not be fast enough to keep up with all of the now-required tasks, and/or may not have sufficient memory to handle the software code or RAM required for the additional tasks.

On the other hand, if every network port blade must be changed to implement the features, then this typically requires replacing every hardware blade in the system. The cost of replacing every blade is prohibitive. In addition, each of the blades may need to have the additional memory and CPU power to handle the new features.

As described herein, an embodiment of the present invention avoids the above-discussed disadvantages of the prior solutions. In accordance with an embodiment of the invention, significant additional tasks due to new features may be advantageously confined to a single blade of the system (the "feature" blade). The single feature blade may be replaced and upgraded much more economically than upgrading all blades of the system.

In accordance with an embodiment of the invention, the ability to add features by upgrading a single feature blade is made possible by preserving and "smuggling" pertinent non-packet information (such as, for example, network or sourcing information) for each packet of interest from the non-feature blades to the feature blade. Such non-packet information would otherwise have been "lost" in the system in that the information would not normally be preserved when forwarding the packet from the non-feature blade to the feature blade. The information-smuggling capability may generally be added to a system's pre-existing non-feature blades by way of a mere software upgrade.

Figure 1:
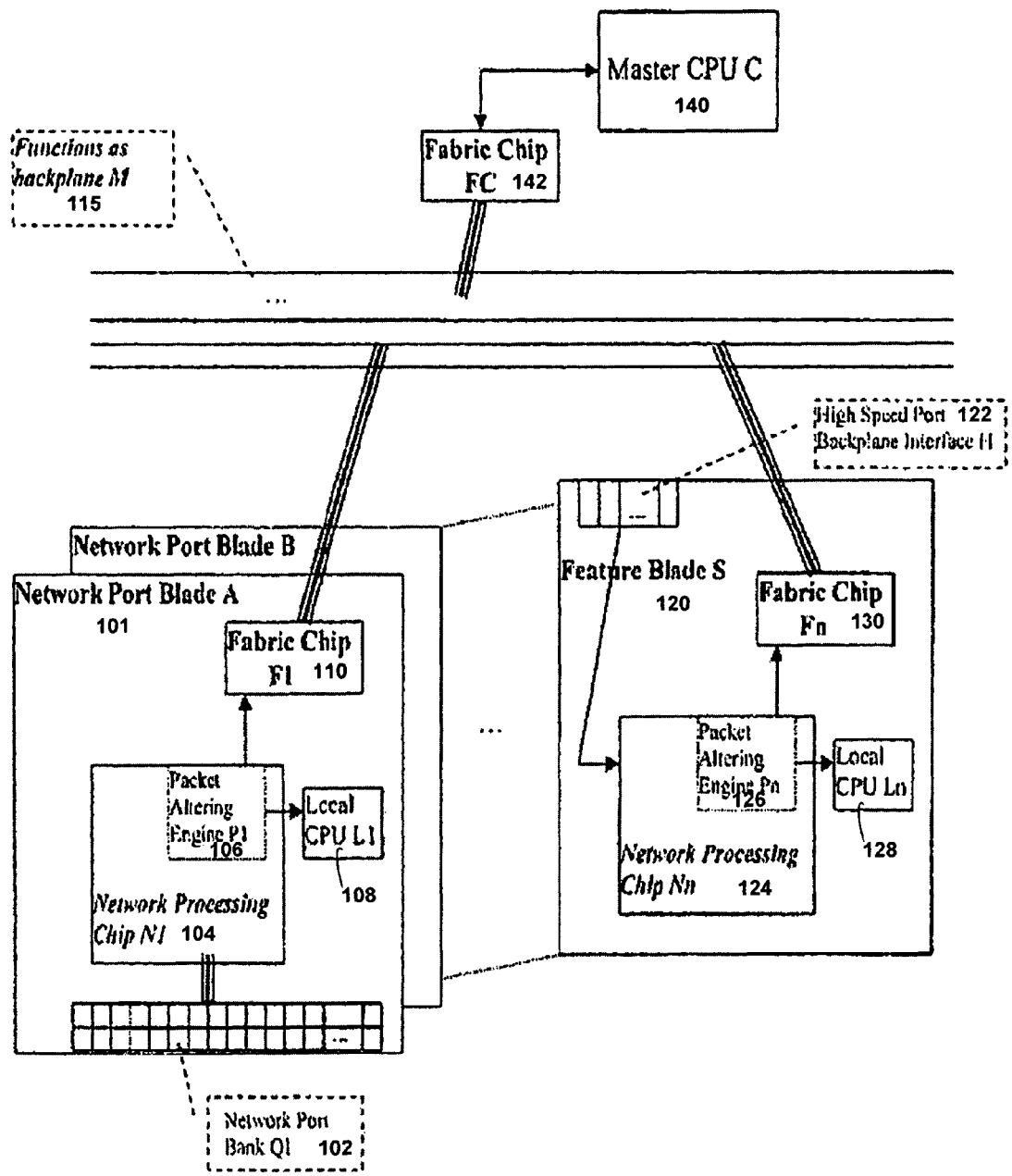
FIG. 1 is a schematic diagram of an exemplary system within which an embodiment of the invention may be practiced.

FIG. 1 is a schematic diagram of an exemplary system 100 within which an embodiment of the invention may be practiced. The system 100 may be, for example, a network switch, or other network device. The system 100 may include a backplane 115 to which a master CPU 140 and multiple network port blades 101 are connected via fabric chips (for example, FC 142, F1 110, and Fn 130 shown in FIG. 1).

Network packets may enter the system 100 via a network port bank 102 on a network port blade 101. Each blade 101 may include a plurality of port banks 102, and the system 100 may include a plurality of such blades 101.

Consider packets entering the system 100 via a normal "non-feature" blade. The packets may be pre-processed by a network processing chip 104. The pre-processing may include forwarding to a packet altering engine 106 for potential dynamic modification of forwarding decisions and of the packet contents themselves. The packets may also be sent to the local CPU 108 for processing. Packets may be sent to the backplane 115 via the fabric chip 110.

Figure 2:
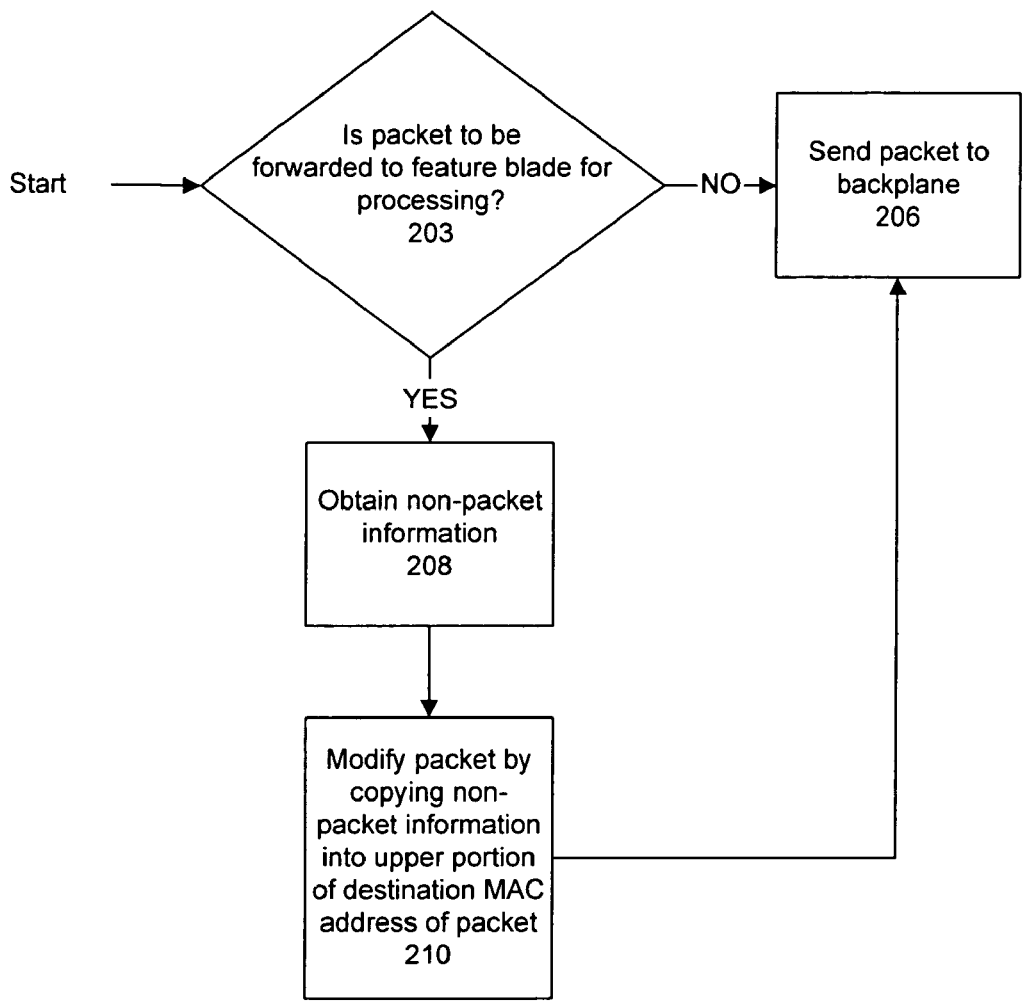
FIG. 2 is a flow chart depicting a method of smuggling non-packet information in accordance with an embodiment of the invention.

In accordance with an embodiment of the invention, each of the non-feature blades 101 in the system 100 may be configured, in part, to process the packets according to the method 200 shown in FIG. 2. This processing is used to effectively send pertinent non-packet information to the feature blade 120 by "smuggling" the information in the packet.

As shown in FIG. 2, a determination 203 is made as to whether or not a packet is to be forwarded to the feature blade for processing. In particular, packets of interest in relation to features added via the feature blade would be forwarded to the feature blade for processing. If the packet is not to be forwarded to the feature blade for processing, then the packet may be simply sent 206 by the non-feature blade 101 to the backplane 115 (without smuggled non-packet information).

On the other hand, if the packet is to be forwarded to the feature blade for processing, then the pertinent non-packet information may be obtained 208. The non-packet information may include, for example, an identification of the external physical port on which a packet was received from the network (the source port). The non-packet information may include other data which is not normally present in a packet.

The packet is modified 210 so as to "smuggle" the non-packet information therein. In one implementation, the modification of the packet may occur via software executed by the CPU 108, but modification using the CPU would be somewhat slow and would typically involve the CPU software-forwarding or software-routing the packets. In another implementation, the modification of the packet may be performed in a portion of the network processing chip 104, where post-ASIC-implementation behaviors formed by high-level rules may be programmed by software. In the preferred embodiment of the invention, the modification is performed by the Packet-Altering Engine 106.

In accordance with a preferred embodiment of the invention, the "smuggling" is accomplished by copying the non-packet information into an upper portion of a packet's Layer 2 destination MAC address. This is described further below in relation to FIG. 3.

Thereafter, the modified packet is sent 206 to the backplane 115 to be forwarded to the feature blade 120.

Figure 3:
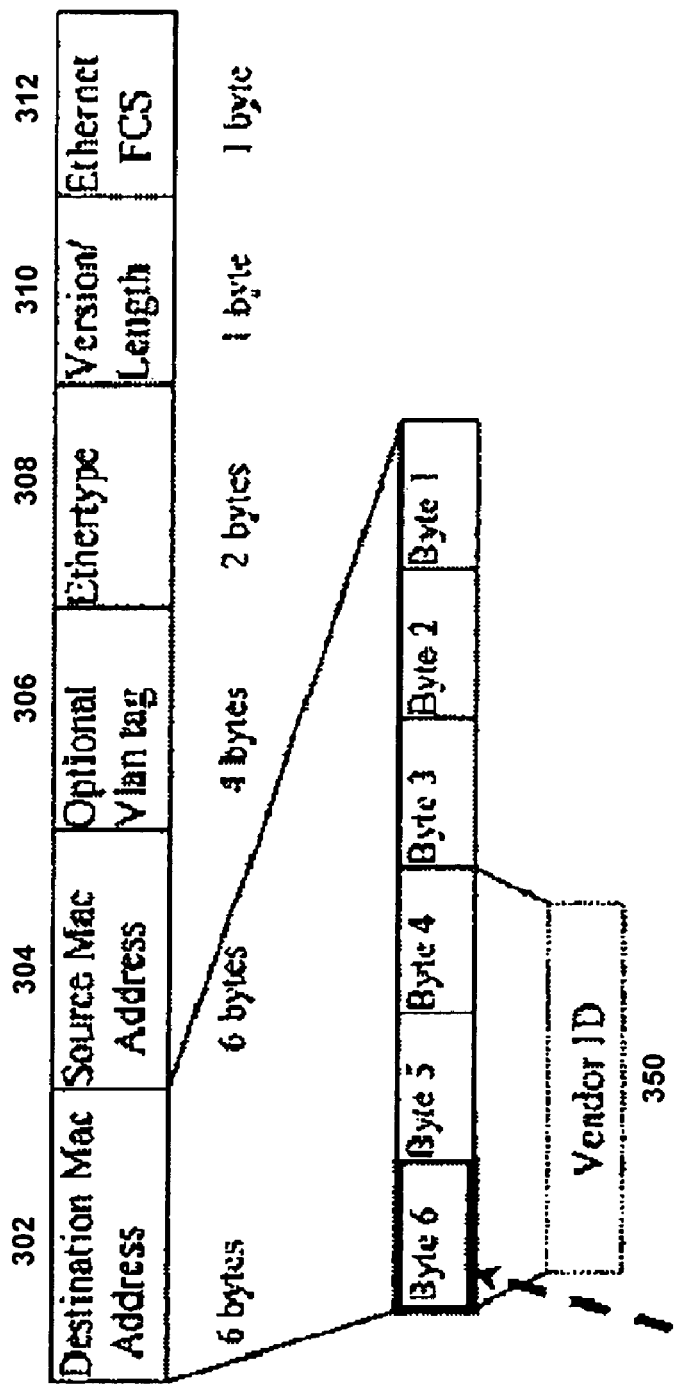
FIG. 3 is a diagram of an Ethernet packet header.

FIG. 3 is a diagram of an Ethernet packet header 300. The header 300 includes a destination MAC address 302, source MAC address 304, optional VLAN tag 306, ethertype field 308, a version/length byte 310, and an ethernet FCS byte 312.

The destination MAC address 302 is six bytes wide. In accordance with a preferred embodiment, one or a few bytes of the destination MAC address 302 is used to "smuggle" the non-packet information because it is a relatively large field (six bytes wide), and it is unique to the destination device. Both aforementioned attributes make it easier to restore the original information, as only the one or the few bytes of the address need to be restored.

As shown in FIG. 3, the upper three bytes of the destination MAC address 302 comprise the vendor identification portion 350, and the lower three bytes comprise the non-vendor-specific addressing. The upper three (vendor-specific) bytes 350 of vendor information are typically not unique on a proprietary network (due to the network having multiple devices from the same vendor). On the other hand, the lower three (non-vendor-specific) bytes of the MAC address will most likely provide a sufficiently unique identification. In other words, the lower three bytes should normally be sufficient to avoid packet collision events (which would require added work by the system 100).

Hence, in accordance with a preferred embodiment, the upper three (vendor-specific) bytes are designated as usable to smuggle the non-packet information. As such, in this embodiment, the smuggled information must be three bytes or smaller in size. For example, the system physical source port information may be smuggled by copying it into the single uppermost byte (byte 6) of the destination MAC address 302.

Returning to FIG. 1, packets from the backplane 115 that have been forwarded to the feature blade 120 may be received into the high-speed port backplane interface 122, and may then be sent to the network processing chip 124. The network processing chip 124 may process and/or modify the packets as if the packets had come from the network directly. Additional features implemented in the feature blade 120 may be performed by the network processing chip 124 using the packet altering engine 126 and/or the local CPU 128. Thereafter, the packets may be either dropped, or sent via the fabric chip 130 back to the system backplane 115 with packet modification and/or forwarding-decision modification. A forwarding-decision modification may affect the specific external port which may be used by the packet to leave the system to re-enter the network.

FIG. 4 is a flow chart depicting a method 400 of recovering non-packet information in accordance with an embodiment of the invention. In one implementation, the feature blade 120 may be set or pre-set in a preliminary step 402 to receive packets from the backplane in a promiscuous mode. In other words, the hardware media access controller (hardware MAC) of the feature blade 120 is set up to receive all packets that are sent to it and to process only those which are truly destined for the feature blade 120 (for example, those packets indicating destination chip ID and destination port information matching those for the feature blade 120).

Hence, when a network packet is received 404 at the feature blade 120 from the backplane 115, a determination 406 is made as to whether or not the packet is to be processed by the feature blade 120. If the packet is not to be processed by this blade, then this method 400 ends 408.

If the packet is to be processed by this blade, then the "smuggled" information is retrieved 410 from the packet by the feature blade 120. As discussed above, in accordance with one embodiment, the smuggled information may be retrieved from an upper portion of the destination MAC address 302. The feature blade 120 then may proceed with further processing 411 of the network packet. The further processing 411 may involve various actions. Such actions may include, for example, the dropping of the packet altogether, dropping the packet if it is of a certain IP sub-protocol type, dropping the packet if it is for a certain destination IP address or range of destination IP addresses, replacing the IP source address in the packet with the IP address of the feature blade, restricting the receiver list, and/or other actions.

A decision 412 is made as to whether the packet is to be forwarded (not dropped) by the feature blade 120. If the packet is not to be forwarded, then the packet is to be dropped 414, ending the process. Otherwise, if the packet is to be forwarded, then the feature blade 120 performs actions to restore 416 the original MAC destination address prior to forwarding 418 the packet.

FIG. 5 is a flow chart depicting a method 500 of restoring 416 a MAC destination address in accordance with an embodiment of the invention. For example, if the packet is of the IPX protocol type (determined in step 502), then the information to restore 416 the original MAC destination address is contained within and obtained from the IPX destination address further on in the packet (step 504). On the other hand, if the packet is of the IP protocol type (step 505), then the feature blade 120 can use a local IP-to-MAC address cache to determine the MAC address (see steps 506 and 507), or can use message communication with the master CPU 140 to request the MAC address that is associated with the destination IP address of the packet (step 508). The master CPU 140 keeps address tables of IP-to-MAC address mappings. If the master CPU 140 does not already know the destination MAC address that is needed, then the master CPU 140 may send a "reverse ARP" (reverse Address Resolution Protocol) request to the network to obtain the information (step 514), and then pass the information back to the feature blade 120. The feature blade 120 then restores 416 the original MAC destination address back into the packet, and forwards 418 the packet out to the appropriate receivers. (Note, as discussed above, these receivers may have been altered during the processing 411.)

Under some circumstances, the original destination MAC address may not be determined or found. For example, it may not be found because the recipient device has never or has not recently transmitted on the network. In accordance with one embodiment, if the original destination MAC address cannot be found, then the feature blade 120 may elect to drop the packet. The alternative of flooding the packet is not workable because the true destination MAC address could not be restored. However, dropping the packet advantageously satisfies the need of security, as it is possible that the indicated receiver device does not exist, and that the packet is a malicious attempt to fill the network with floods of unknown unicast packets. If the receiver device does exist, then it should eventually transmit on the network and so will eventually receive its traffic from the system.

The disclosure of the present application provides various advantages over conventional solutions. Conventional solutions would typically include the intelligence for the added feature being either (a) on every blade 101 or (b) with the master CPU 140 on the chassis motherboard. This is so that every packet could be screened for whether the intelligence is needed. Putting the intelligence for the added feature on every blade requires sufficient CPU-processing power and memory resources on each blade. This is expensive and may require a new hardware release of the blades to add the necessary resources. Putting the intelligence for the added feature on the master motherboard is typically problematic as resources may be difficult to add to the motherboard. Once the hardware has shipped, the master motherboard may not be upgradeable without replacing the entire system. Additionally, CPU processing on the master motherboard may not be sufficiently fast to support this feature in addition to other, more necessary, network features.

In contrast, the disclosure of the present application advantageously allows a single "feature" blade to be later introduced into an already-shipped system, where extensive intelligent features could be added to the system as a separate package purchased by customers. This provides extensible capabilities and longer operating life to the system without the customer having to replace it.

The disclosure of the present application solves at least the following two problems in typical conventional systems.

First, in a typical network chassis switch or similar system, although the feature blade and any other system blades can communicate with the master CPU, they cannot communicate directly with each other. In such systems, the feature blade cannot make inquiries to other blades, and other blades cannot send explicit messages to the feature blade. This problem is solved by smuggling the non-packet information as described herein. The packet itself, rather than a message, is then forwarded to the feature blade, and the needed information is then decoded from the packet.

Second, in a typical network chassis switch or similar system, packets forwarded from one blade to another blade lose certain non-packet information when the packets cross the switch chassis backplane in route to the destination blade. For example, the information lost may include the originating port for the packet, which may be needed for if the destination (feature) blade is to provide the desired extra features. For example, the feature blade may be designed to perform security functions on certain of the chassis' external ports. In order to determine which security function should be performed, the feature blade may need to know the specific source port in the chassis system which the packet is from. This information is not part of a network packet, as it is specific to the local system. This problem is solved by smuggling the non-packet information as described herein.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A networking apparatus comprising:
   a plurality of blade subsystems; and
   a master system communicatively coupled to the blade subsystems, wherein a particular blade subsystem is configured to provide an additional feature in relation to processing network packets, wherein remaining blade subsystems are configured to send non-packet information to the particular blade subsystem by removing original information from a packet and replacing the original information with the non-packet information, the original information comprising a portion of a destination address of the packet, wherein the particular blade subsystem is further configured to retrieve the non-packet information from the packet, and wherein the particular blade system is further configured to restore the original information in the packet prior to forwarding the packet by the particular blade subsystem if the packet is not to be dropped by the particular blade subsystem and configured to drop the packet if the packet is for one of predetermined internet protocol (IP) addresses.

2. The networking apparatus of claim 1, wherein the original information comprises a portion of a destination MAC address of the packet.

3. The networking apparatus of claim 2, wherein the portion of the destination MAC address is within an upper three bytes of the destination MAC address.

4. The networking apparatus of claim 1, wherein the original information is restored using data in another field of the packet.

5. The networking apparatus of claim 1, wherein the original information is restored using data obtained by the master system and sent from the master system to the particular blade subsystem.

6. The networking apparatus of claim 1, wherein the networking apparatus comprises a network switch, wherein the master subsystem comprises a motherboard having a master CPU thereon, and wherein the blade subsystems comprise network port blades each having a local CPU thereon.

7. A method of providing an additional feature to an existing networking apparatus having a master system coupled to multiple blade subsystems, the method comprising
replacing a blade subsystem with a feature blade subsystem configured to provide the additional feature in relation to processing a network packet forwarded to the feature blade subsystem and to retrieve non-packet information from the packet; and
configuring the remaining blade subsystems to embed the non-packet information in the packet forwarded to the feature blade subsystem and to send the non-packet information to the particular blade subsystem by removing original information from the packet and replacing the original information with the non-packet information, the original information comprising a portion of a destination address of the packet, and wherein the feature blade system is further configured to restore the original information in the packet prior to forwarding the packet by the feature blade subsystem if the packet is not to be dropped by the feature blade subsystem and configured to drop the packet if the packet is for one of predetermined internet protocol (IP) addresses.

8. The method of claim 7, wherein the non-packet information is embedded in the packet by replacing the original information in a MAC destination address of the packet.

9. The method of claim 7, wherein the networking apparatus comprises a network switch, wherein the master subsystem comprises a motherboard having a master CPU thereon, and wherein the blade subsystems comprise network port blades each having a local CPU thereon.

10. A method of providing additional processing of packets in a networking apparatus having a master system coupled to multiple blade subsystems, the method comprising:
determining whether a packet received at a blade subsystem is to receive the additional processing;
if the packet is to receive the additional processing, then removing original information from the packet and replacing the original information with non-packet information, the original information comprising a portion of a destination address of the packet, and forwarding the modified packet to a particular blade subsystem for the additional processing;
restoring the original information in the packet prior to forwarding the packet by the particular blade subsystem if the packet is not to be dropped by the particular blade subsystem; and
dropping the packet if the packet is for one of predetermined internet protocol (IP) addresses.

11. The method of claim 10, wherein the non-packet information is embedded in the packet by replacing the original information in a MAC destination address of the packet.

12. The method of claim 11, wherein a specific field of the packet comprises a vendor-specific portion of the MAC destination address.

13. The method of claim 10, wherein the original information is restored using data in another field of the packet.

14. The method of claim 10, wherein the original information is restored using data obtained by the master system and sent from the master system to the particular blade subsystem.

15. A system configured to provide additional processing of packets, the system comprising:
a network switch comprising a backplane and a master CPU coupled to the backplane by way of a fabric chip; and
multiple network port blades, each comprising a local CPU and being coupled to the backplane by way of a fabric chip,
wherein the additional processing of packets received on any of the network port blades is provided by a particular network port blade, and wherein non-particular network port blades are configured to determine whether a packet received is to receive the additional processing by the particular network port blade and further configured to remove original information from the packet and replace the original information with non-packet information, the original information comprising a portion of a destination address of the packet, and wherein the particular network port blade is further configured to restore the original information in the packet prior to forwarding the packet by the particular network port blade if the packet is not to be dropped by the particular network port blade and configured to drop the packet if the packet is for one of predetermined internet protocol (IP) addresses.

16. The system of claim 15, wherein, if the determination finds that the packet is to receive the additional processing, then the packet is modified by replacing the original information in the packet with the non-packet information.

17. A method of indirect communication of non-packet data from a first blade subsystem to a second blade subsystem in an apparatus having a master system interconnected with multiple blade subsystems, the method comprising:
using the first blade subsystem for removing original information from a packet and replacing the original information with the non-packet data, the original information comprising a portion of a destination address of the packet, and forwarding the packet to the second blade subsystem; and
using the second blade subsystem for receiving the packet and retrieving the non-packet data from the packet, wherein the second blade subsystem is further configured to restore the original information in the packet prior to forwarding the packet by the second blade subsystem if the packet is not to be dropped by the second blade subsystem and configured to drop the packet if the packet is one of predetermined internet protocol (IP) addresses.

18. The method of claim 17, wherein the first and second blade subsystems do not have a path for direct communication of the non-packet data.

* * * * *

UNITED STATES PATENT AND TRADEMARK OFFICE
CERTIFICATE OF CORRECTION

| | |
|---|---|
| PATENT NO. | : 8,306,023 B2 |
| APPLICATION NO. | : 11/018061 |
| DATED | : November 6, 2012 |
| INVENTOR(S) | : Karen E. Kimball |

It is certified that error appears in the above-identified patent and that said Letters Patent is hereby corrected as shown below:

In the Claims:

In column 6, line 59, in Claim 1, delete "blade system" and insert -- blade subsystem --, therefor.

In column 7, line 13, in Claim 6, delete "master subsystem" and insert -- master system --, therefor.

In column 7, line 18, in Claim 7, after "comprising" insert -- : --.

In column 7, line 32, in Claim 7, delete "blade system" and insert -- blade subsystem --, therefor.

In column 7, lines 42-43, in Claim 9, delete "master subsystem" and insert -- master system --, therefor.

Signed and Sealed this
Twenty-fourth Day of September, 2013

Teresa Stanek Rea
*Deputy Director of the United States Patent and Trademark Office*